UNITED STATES PATENT OFFICE.

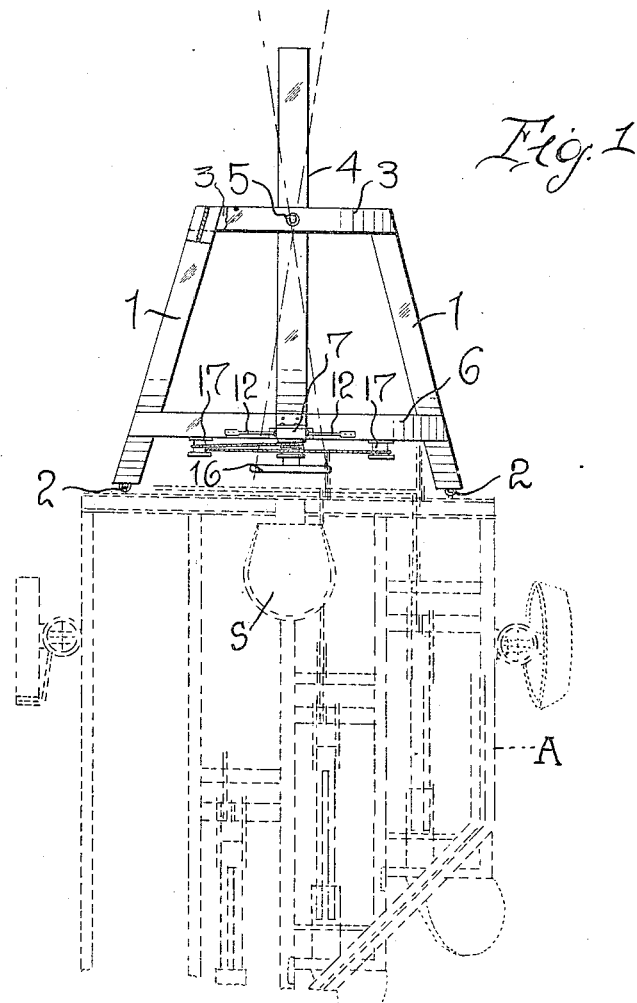
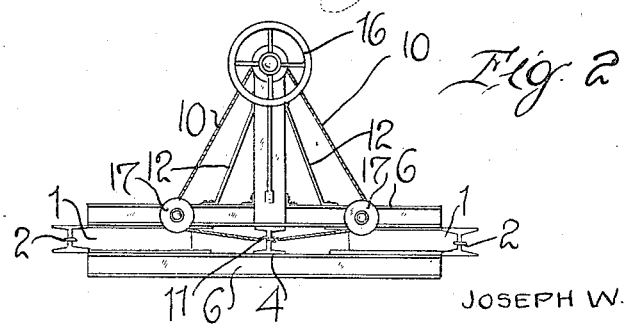

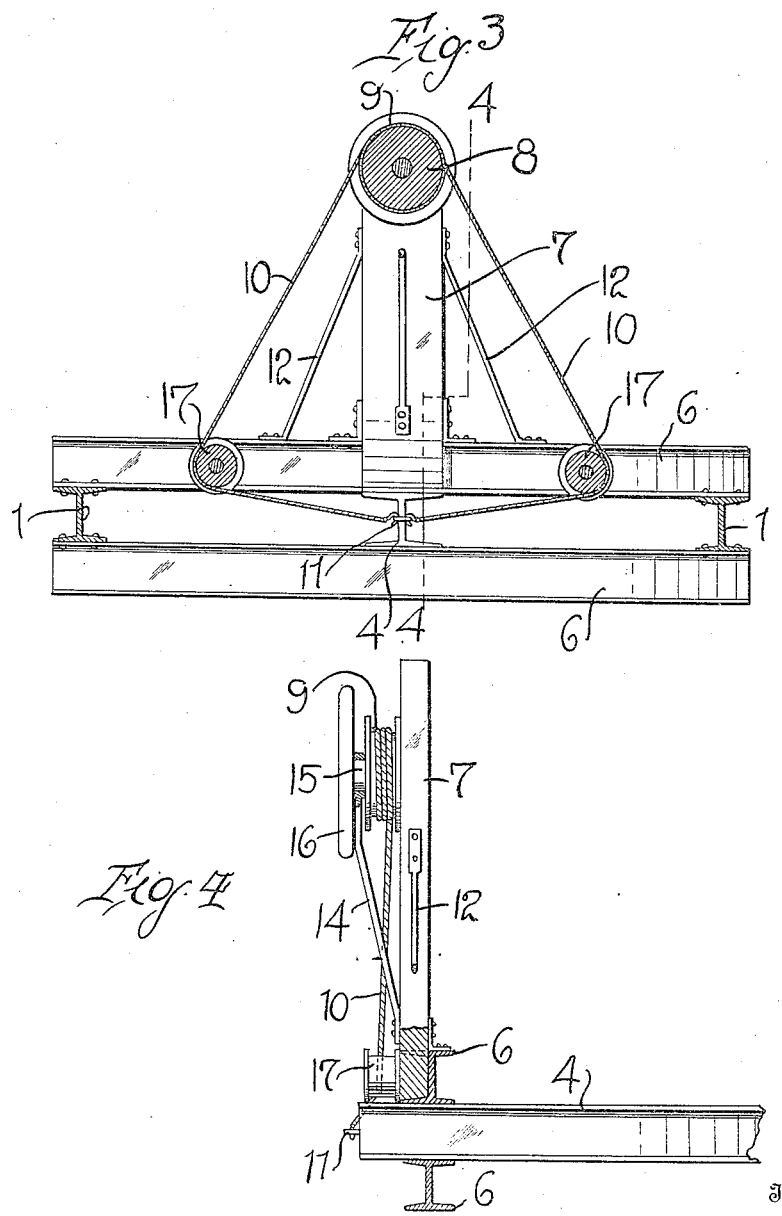

JOSEPH W. HOLMES, OF BEACH, NORTH DAKOTA, ASSIGNOR OF ONE-HALF TO EMIL R. SUNDE, OF BEACH, NORTH DAKOTA.

SIDEHILL-PLOW HITCH.

1,125,323.   Specification of Letters Patent.   Patented Jan. 19, 1915.

Application filed August 24, 1914. Serial No. 858,402.

*To all whom it may concern:*

Be it known that I, JOSEPH W. HOLMES, a citizen of the United States, residing at Beach, in the county of Golden Valley and State of North Dakota, have invented certain new and useful Improvements in Sidehill-Plow Hitches, of which the following is a specification, reference being had to the accompanying drawings.

This invention relates to certain improvements in plow hitches, and the object of the invention is to provide a device of this general character adapted to be interposed between the plow and the tractor and capable of operation to conveniently and effectively avoid the excessive side draft on the plow and tractor on a hill side.

The invention consists in the details of construction and in the combination and arrangement of the several parts of my improved plow hitch whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, in which—

Figure 1 is a view in top plan of a hitch constructed in accordance with the embodiment of my invention, the plow to which it is applied being shown in dotted lines; Fig. 2 is a view in rear elevation of my improved hitch as herein embodied; Fig. 3 is an enlarged view in rear elevation of my improved hitch with certain of the parts in section, and Fig. 4 is a sectional view taken substantially on the line 4—4 of Fig. 3.

As disclosed in the accompanying drawings, 1—1 denote side bars, herein disclosed as arranged on forwardly diverging planes, the rear extremity whereof being adapted to be coupled as indicated at 2 to the plow A, which plow may be of any ordinary or preferred construction.

The forward extremities of the side bars 1 are tied or connected by the vertically alined cross bars 3 between which is directed the draft pole 4 pivotally connected with the forward cross bar 3, as indicated at 5, whereby it will be readily perceived that the draft pole 4 is capable of lateral swinging movement which is attained in a manner which will hereinafter be more fully set forth. As is believed to be clearly obvious, the forward extremity of the draft pole 4 is adapted to be suitably coupled to a tractor of any ordinary or preferred construction. It will be observed that when the plow and engine are on a hill side the side draft thereof may be readily overcome by proper lateral adjustment of the draft pole 4, whereby it is assured that the plow is set over as much as may be desired.

As herein disclosed, the rear extremity of the draft pole 4 projects between the rear vertically alined cross bars 6 suitably connected to the side bars 1, and projecting upwardly from the upper bar 6, at the longitudinal center thereof, is the standard 7 having suitably mounted adjacent its upper extremity the drum 8, around which is coiled, as indicated at 9, the intermediate portion of the flexible member 10, preferably a cable, the extremities whereof being suitably connected as at 11 to the rear or projected extremity of the draft pole 4. In order to reinforce the standard 7 I find it of advantage to employ the braces 12, as particularly shown in Fig. 3, and in order that the drum 8 may be further supported I find it of advantage to employ the brace bar 14, as particularly shown in Fig. 4.

The drum 8 is provided at its axial center with a rearwardly projecting extension 15 having suitably fixed thereto an operating wheel 16, whereby it will readily be observed that the plowman occupying the seat S may readily adjust the draft pole 4 without the necessity of bringing the plow to a standstill, as is now generally done when a hill is reached. As is believed to be obvious, the flexible member or cable 10 is suitably disposed around the idle pulleys 17 herein disclosed as disposed rearwardly of the upper bar 6 and at predetermined distances from the opposite sides of the standard 7.

From the foregoing description it is thought to be obvious that a plow hitch constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. A hitch of the character described comprising side bars disposed on forwardly converging planes, alined cross bars connecting the forward extremities of the side bars and secured to the opposite faces thereof, alined cross bars connecting the rear portions of the side bars and secured to opposite faces thereof, coupling means carried by the rear extremities of the side bars, a draft pole projecting between the cross bars and terminating rearwardly of the rear cross bars, means for pivotally connecting the draft pole with the forward cross bars, an upright carried by the upper rear cross bar, guide pulleys projecting rearwardly from the upper rear cross bar at opposite sides of the longitudinal center thereof and at opposite sides of the draft pole, a drum rotatably supported by the upright and provided with means for rotating the same, and a flexible member wound around the drum and having its extremities secured to the rearwardly projecting portion of the draft pole, said flexible member being also disposed around the guide pulleys.

2. A hitch of the character described comprising side bars disposed on forwardly converging planes, alined cross bars connecting the forward extremities of the side bars and secured to the opposite faces thereof, alined cross bars connecting the rear portions of the side bars and secured to opposite faces thereof, coupling means carried by the rear extremities of the side bars, a draft pole projecting between the cross bars and terminating rearwardly of the rear cross bars, means for pivotally connecting the draft pole with the forward cross bars, an upright carried by the upper rear cross bar, guide pulleys projecting rearwardly from the upper rear cross bar at opposite sides of the longitudinal center thereof and at opposite sides of the draft pole, a drum rotatably supported by the upright and provided with means for rotating the same, a flexible member wound around the drum and having its extremities secured to the rearwardly projecting portion of the draft pole, said flexible member being also disposed around the guide pulleys, and a brace bar connected to the upright and terminating in a bearing for the drum.

In testimony whereof I hereunto affix my signature in the presence of two witnesses.

JOSEPH W. HOLMES.

Witnesses:
 E. R. SUNDE,
 EMIL OLSON.

Copies of this patent may be obtained for five cents each, by addressing the "Commissioner of Patents, Washington, D. C."